(12) United States Patent
Hayashi et al.

(10) Patent No.: US 11,750,015 B2
(45) Date of Patent: Sep. 5, 2023

(54) INFORMATION PROCESSING APPARATUS, CONTROL METHOD OF INFORMATION PROCESSING APPARATUS, AND NON-TRANSITORY COMPUTER-READABLE STORAGE MEDIUM

(71) Applicant: BROTHER KOGYO KABUSHIKI KAISHA, Nagoya (JP)

(72) Inventors: Seigo Hayashi, Nagoya (JP); Hajime Usami, Nagoya (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 165 days.

(21) Appl. No.: 17/086,330

(22) Filed: Oct. 31, 2020

(65) Prior Publication Data

US 2021/0135477 A1 May 6, 2021

(30) Foreign Application Priority Data

Oct. 31, 2019 (JP) .................. 2019-198346

(51) Int. Cl.
*H02J 7/04* (2006.01)
*H02J 7/00* (2006.01)
*H04N 1/00* (2006.01)

(52) U.S. Cl.
CPC .... *H02J 7/007182* (2020.01); *H02J 7/00041* (2020.01); *H02J 7/0044* (2013.01); *H04N 1/00901* (2013.01); *H04N 1/00907* (2013.01)

(58) Field of Classification Search
None
See application file for complete search history.

(56) References Cited

U.S. PATENT DOCUMENTS

| | | | |
|---|---|---|---|
| 2013/0257346 A1* | 10/2013 | Jakins | H02J 7/35 320/107 |
| 2015/0380924 A1 | 12/2015 | Ohwaki | |
| 2016/0116928 A1 | 4/2016 | Motoki | |
| 2019/0386504 A1* | 12/2019 | Yao | H02J 7/00302 |

FOREIGN PATENT DOCUMENTS

| | | |
|---|---|---|
| JP | 2002-207538 A | 7/2002 |
| JP | 2014-191638 A | 10/2014 |
| JP | 2016-13024 A | 1/2016 |
| JP | 2016-72685 A | 5/2016 |
| JP | 2016-085591 A | 5/2016 |
| JP | 2019-519837 A | 7/2019 |
| WO | 2017-189852 A1 | 11/2017 |

OTHER PUBLICATIONS

Japanese Office Action for the related Japanese Patent Application No. 2019-198346 dated Jul. 4, 2023.

* cited by examiner

*Primary Examiner* — Arun C Williams
(74) *Attorney, Agent, or Firm* — Kenealy Vaidya LLP

(57) ABSTRACT

An information processing apparatus includes a power processor, an interface, a detector that detects at least one of a voltage value and a current value on an electric power line which connects the power processor and the interface, and a controller. The controller notifies a swap request for swapping electric power roles with an external device to the external device via the interface in a case where a detection value of the detector indicates an abnormal value while electric power is supplied to the external device via the interface.

20 Claims, 7 Drawing Sheets

FIG. 3

MODE INFORMATION

| MODE | POWER CONSUMPTION | REQUESTING ELECTRIC POWER OF SWAP REQUEST |
|---|---|---|
| LOW POWER CONSUMPTION MODE | 3W | 10W OR HIGHER |
| STANDBY MODE | 10W | 10W OR HIGHER |
| SCAN MODE | 40W | 40W OR HIGHER |
| PRINT MODE | 70W | 70W OR HIGHER |
| COPY MODE | 90W | 90W OR HIGHER |

INFORMATION PROCESSING APPARATUS, CONTROL METHOD OF INFORMATION PROCESSING APPARATUS, AND NON-TRANSITORY COMPUTER-READABLE STORAGE MEDIUM

CROSS-REFERENCE TO RELATED APPLICATION

This application is based upon and claims the benefit of priority from prior Japanese patent application No. 2019-198346, filed on Oct. 31, 2019, the entire contents of which are incorporated herein by reference.

TECHNICAL FIELD

The present disclosure relates to an information processing apparatus that supplies electric power to an external device, a control method of the information processing apparatus, and a non-transitory computer-readable storage medium storing a computer program executed by a computer mounted on the information processing apparatus.

BACKGROUND

In the related art, an information processing apparatus which supplies electric power to an external device via an interface is suggested. For example, JP-A-2016-13024 discloses an overcurrent detection circuit which monitors a current value of current supplied by a current monitoring unit in a case of supplying electric power from a USB port of USB PD (USB Power Delivery) standards to an external device. When a detected current value exceeds a threshold value, the overcurrent detection circuit turns off a switch connected to a Vbus and stops the supply of electric power from the USB port to the external device.

JP-A-2016-72685 discloses an image forming apparatus in which a Vbus switch is connected between a power supply and a USB port. The Vbus switch stops the supply of electric power to the USB port when it is detected that overcurrent flows.

SUMMARY

In the overcurrent detection circuit disclosed in JP-A-2016-13024 and the image forming apparatus disclosed in JP-A-2016-72685, when overcurrent is detected while supplying electric power, the supply of electric power is stopped. As a result, communication with a device that is an electric power sink cannot be performed, so that communication between an electric power source and the electric power sink may be disconnected.

An object of the present disclosure is to provide an information processing apparatus that enables to continuously perform communication with a device when stopping supply of electric power due to an electric power abnormality occurring in the apparatus being an electric power source, a control method of the information processing apparatus, and a non-transitory computer-readable storage medium storing a computer program executed by a computer mounted on the information processing apparatus.

A first aspect of the present disclosure is an information processing apparatus including:
 a power processor;
 an interface;
 a detector configured to detect at least one of a voltage value and a current value on an electric power line that connects the power processor and the interface; and
 a controller configured to notify a swap request for swapping electric power roles with an external device to the external device via the interface in a case where a detection value of the detector indicates an abnormal value while electric power is supplied to the external device via the interface.

The contents of the first aspect of the present disclosure can be implemented not only as the information processing apparatus but also as a control method of controlling the information processing apparatus and a non-transitory computer-readable storage medium storing a computer program that is executed by a computer mounted on the information processing apparatus.

A second aspect of the present disclosure is a control method of the information processing apparatus including:
 a power processor;
 an interface; and
 a detector configured to detect at least one of a voltage value and a current value on an electric power line that connects the power processor and the interface,
 the control method including the step of:
 notifying a swap request for swapping electric power roles with an external device to the external device via the interface in a case where a detection value of the detector indicates an abnormal value while electric power is supplied the an external device via the interface.

A third aspect of the present disclosure is a non-transitory computer-readable storage medium storing a computer program, when executed by a computer mounted on the information processing apparatus including:
 a power processor;
 an interface; and
 a detector configured to detect at least one of a voltage value and a current on an electric power line that connects the power processor and the interface each other,
 the computer program being configured to cause the information processing apparatus to:
 notify a swap request for swapping electric power roles with an external device to the external device via the interface in a case where a detection value of the detector indicates an abnormal value while electric power is supplied to the external device via the interface.

According to the information processing apparatus, the control method of the information processing apparatus and the non-transitory computer-readable storage medium storing the computer program of the present disclosure, when an electric power abnormality occurs while supplying electric power to the external device functioning as an electric power source, the swap request is notified to the external device to swap an electric power source and an electric power sink each other. The external device is requested to be an electric power source, so that electric power can be received from the external device. Therefore, it is possible to continuously perform communication with the external device.

BRIEF DESCRIPTION OF DRAWINGS

FIG. 3 depicts contents of mode information.

DETAILED DESCRIPTION

Hereinbelow, a portable printer 1 that is an embodiment of the information processing apparatus of the present disclosure will be described with reference to FIG. 1.

(1. Configuration of Portable Printer)

Figure 1:
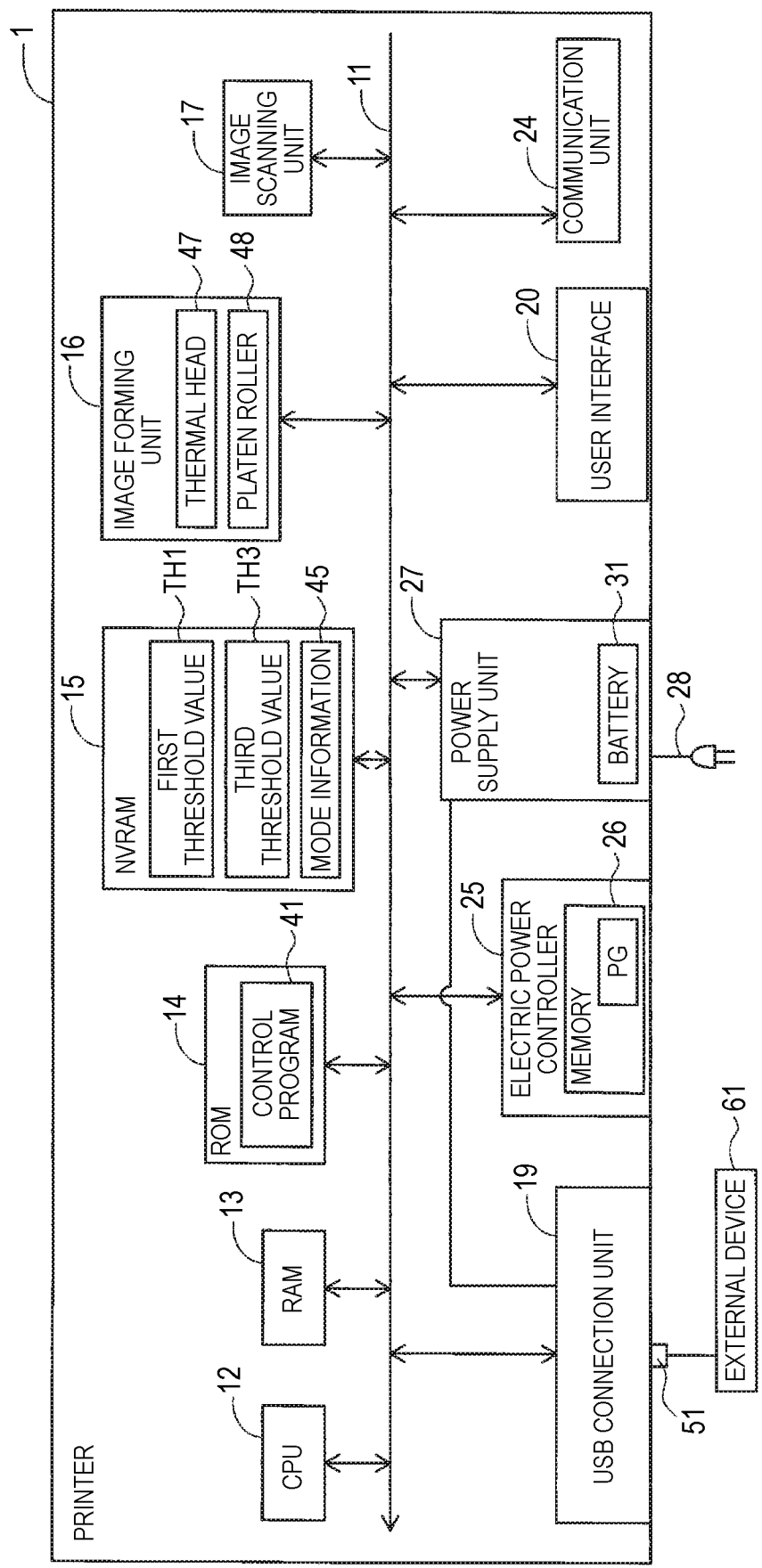
FIG. 1 is a block diagram depicting an electrical configuration of a printer in accordance with an embodiment.

FIG. 1 depicts an electrical configuration of a portable printer 1 in accordance with the present embodiment. The printer 1 is, for example, a portable printing device. The printer 1 prints image data of a print job received from a PC, a smartphone or the like via wired communication or wireless communication on a predetermined sheet (thermal paper), for example. The printer 1 includes a CPU 12, a RAM 13, a ROM 14, an NVRAM 15, an image forming unit 16, an image scanning unit 17, a USB (Universal Serial Bus) connection unit 19, a user interface 20, a communication unit 24, an electric power controller 25, a power supply unit 27, and the like. The CPU 12 and the like are connected to each other via a bus 11. The CPU 12 and the electric power controller 25 are a computer functioning as a controller of the printer 1.

The ROM 14 is a non-volatile memory such as a flash memory, for example, and stores therein a variety of programs such as a control program 41. For example, the CPU 12 executes the control program 41 read out from the ROM 14, thereby activating a system of the printer 1. In the meantime, the data storage destination is an example. For example, the control program 41 may also be stored in the NVRAM 1.5. The storage unit in which the control program 41 is stored may be a computer-readable storage medium. As the computer-readable storage medium, a recording medium such as a CD-ROM and a DVD-ROM may also be adopted, in addition to the above example.

The control program 41 is firmware for collectively controlling each unit of the printer 1, for example. The CPU 12 controls each unit connected with the bus 11 while executing the control program 41 and temporarily storing a result of executed processing in the RAM 13. In descriptions below, the CPU 12 executes the control program 41 may also be simply described as the CPU 12. For example, the description "the CPU 12" may mean "the CPU 12 that executes the control program 41".

The NVRAM 15 is a non-volatile memory. The NVRAM 15 stores a first threshold value TH1, a third threshold value TH3 and mode information 45. The first threshold value TH1 is, for example, a threshold value that is used for comparison with a voltage value detected by a first voltage detection circuit 34, which will be described later.

The third threshold value TH3 is, for example, a threshold value that is used for comparison with a voltage value detected by an AC supply monitoring circuit 36, which will be described later. The mode information 45 is information such as electric power that is required in each mode. The processing that is executed using the mode information 45 will be described later.

The image forming unit 16 includes a line-type thermal head 47, for example, and prints an image on a sheet by a direct thermal method under control of the CPU 12. The image forming unit 16 conveys the sheet by rotating a platen roller 48 provided to face the thermal head 47. For example, upon start of printing, when a sheet is inserted into an insertion opening of the printer 1, the inserted sheet is guided to a facing part between the platen roller 48 and the thermal head 47 and is discharged from a discharge opening after the printing is completed.

The configuration of the image forming unit 16 is an example. The image forming unit 16 may include a toner cartridge, a photosensitive drum, a developing roller, an exposure device and the like, and may execute the printing by an electrophotographic method. Alternatively, the image forming unit 16 may include an inkjet head, an ink cartridge and the like, and may execute the printing by an inkjet method, for example.

The image scanning unit 17 includes a document platen (not shown) and an image sensor such as a CIS (Contact Image Sensor), a CCD (Charge-Coupled Device) and the like. The image scanning unit 17 moves the CIS and the like relative to a document placed on the document platen, scans the document to generate image data, and stores the image data in the RAM 13.

The USB connection unit 19 is an interface which performs communication and electric power transfer that comply with USB PD (USB Power Delivery) standards, for example. The USB connection unit 19 includes a receptacle 51 as a connector. The USB connection unit 19 performs data communication and electric power transfer with a variety of external devices 61 connected to the receptacle 51. In FIG. 1, as an example, one external device 61 is connected to one receptacle 51. As the external device, for example, a variety of devices that can connect based on USB standards, such as a smartphone, a personal computer, a laptop PC, a printer, an external hard disk, a USB memory, a card reader, and the like may be adopted. In the meantime, the USB connection unit 19 may include a plurality of the receptacles 51.

The receptacle 51 is, for example, a connector that complies with USB Type-C standards. The receptacle 51 has a plurality of signal lines for performing data communication and electric power transfer. For example, the receptacle 51 has, as the plurality of signal lines, a TX signal line, an RX signal line, a D signal line, a Vbus signal line, a CC signal line, a ground signal line and the like in the connector of USB Type-C standards. In the meantime, the signal line may also be referred to as a pin. The receptacle 51 performs data communication by using any one of the TX signal line, the RX signal line and the D signal line, for example. The D signal line is, for example, a Data signal line and indicates D+/D−. The receptacle 51 performs a supply of electric power and a reception of electric power by using the Vbus signal line.

The CC signal line is a signal line that is used so as to decide an electric power role, for example, and includes a CC1 signal line and a CC2 signal line, in correspondence to the front and back of a plug connected to the receptacle 51. The CC signal line is also used as a signal line of communication relating to device management, such as an alert message. The receptacle 51 has a dual role power (DRP) function capable of switching to an electric power source that is an electric power role for supplying electric power or an electric power sink that is an electric power role for receiving electric power.

The electric power controller 25 controls supply and reception of electric power, and transmission and reception of data via the USB connection unit 19. The electric power controller 25 decides an electric power role, based on a connection state of the CC signal line (a potential of the CC signal line, and the like) at the time when an external device is connected to the receptacle 51, and to execute negotiation of electric power transfer. As used herein, the negotiation is processing of setting an electric power source or an electric power sink, setting electric power transfer, and the like, for example.

The electric power controller 25 executes negotiation of setting a supply electric power W (refer to FIG. 2) supplied through the Vbus signal line for the receptacle 51 functioning as an electric power source, for example. The electric power controller 25 transmits the external device 61 an electric power list of the supply of electric power (thereafter, referred to "supply electric power") W based on the control of the CPU 12, for example. As used herein, the electric power list is information indicating a combination of a voltage value of a supply voltage Vs (refer to FIG. 2) and a current value of a supply current As (refer to FIG. 2), which can be supplied by the printer 1 as an electric power source. The electric power list can be referred to as a profile. The combination of the voltage value and the current value can also be referred to as a PDO (Power Data Object). For example, in electric power transfer via the USB connection unit 19 of the present embodiment, electric power can be supplied from an electric power source to an electric power sink within a range of electric power from 10 W (5V, 2 A) to 100 W (20V, 5 A). The electric power list is information indicating a combination (PDO) of the voltage value and the current value within the range of electric power, which can be supplied by the printer 1 functioning as an electric power source.

When the receptacle 51 is caused to function as an electric power sink, the electric power controller 25 executes negotiation with respect of reception of electric power via the receptacle 51. The electric power controller 25 requests a combination of a voltage value and a current value that are to be received from the electric power list received from the external device 61 functioning as an electric power source, under control of the CPU 12, for example. When the negotiation is successful, the receptacle 51 receives desired electric power from the external device 61.

As shown in FIG. 1, the electric power controller 25 includes a memory 26. In the memory 26, a program PG is stored. The electric power controller 25 includes a processing circuit such as a CPU, and executes the program PG in the processing circuit, thereby controlling the power supply unit 27, for example. The memory 26 is configured by a combination of a RAM, a ROM, a flash memory and the like, for example.

The power supply unit 27 functions as a power supply for each unit in the printer 1 to supply electric power to each unit. The power supply unit 27 will be described in detail later. The user interface 20 is, for example, a touch panel, and includes a liquid crystal panel, a light source such as LED for irradiating light from a backside of the liquid crystal panel, a touch detection film bonded on a surface of the liquid crystal panel, and the like. The user interface 20 receives an operation on the printer 1 and to output a signal corresponding to an operation input to the CPU 12. The user interface 20 displays information about the printer 1. The user interface 20 changes display contents of the liquid crystal panel, under control of the CPU 12. In the meantime, the user interface 20 may also include operation buttons such as hard keys. The user interface 20 is not limited to the configuration where a display unit and an operation unit are integrated, such as a touch panel, and may also have a configuration where a display unit and an operation unit are separately provided.

The communication unit 24 can enable wired communication and wireless communication. The CPU 12 controls the communication unit 24 to receive a print job and a scan job via wired communication and wireless communication. Thereby, the printer 1 can receive a print job and a scan job via wired communication or wireless communication with a PC, a smartphone and the like, for example. The printer 1 can receive a print job and a scan job via data communication of the USB connection unit 19. The CPU 12 executes printing by the image forming unit 16, based on the received print job. The CPU 12 executes scanning of an image by the image scanning unit 17, based on the received scan job. The CPU 12 receives a print job and a scan job and to execute printing and scanning, based on operation inputs on the user interface 20, (2. Configuration of Power Supply Unit 27)

Figure 2:
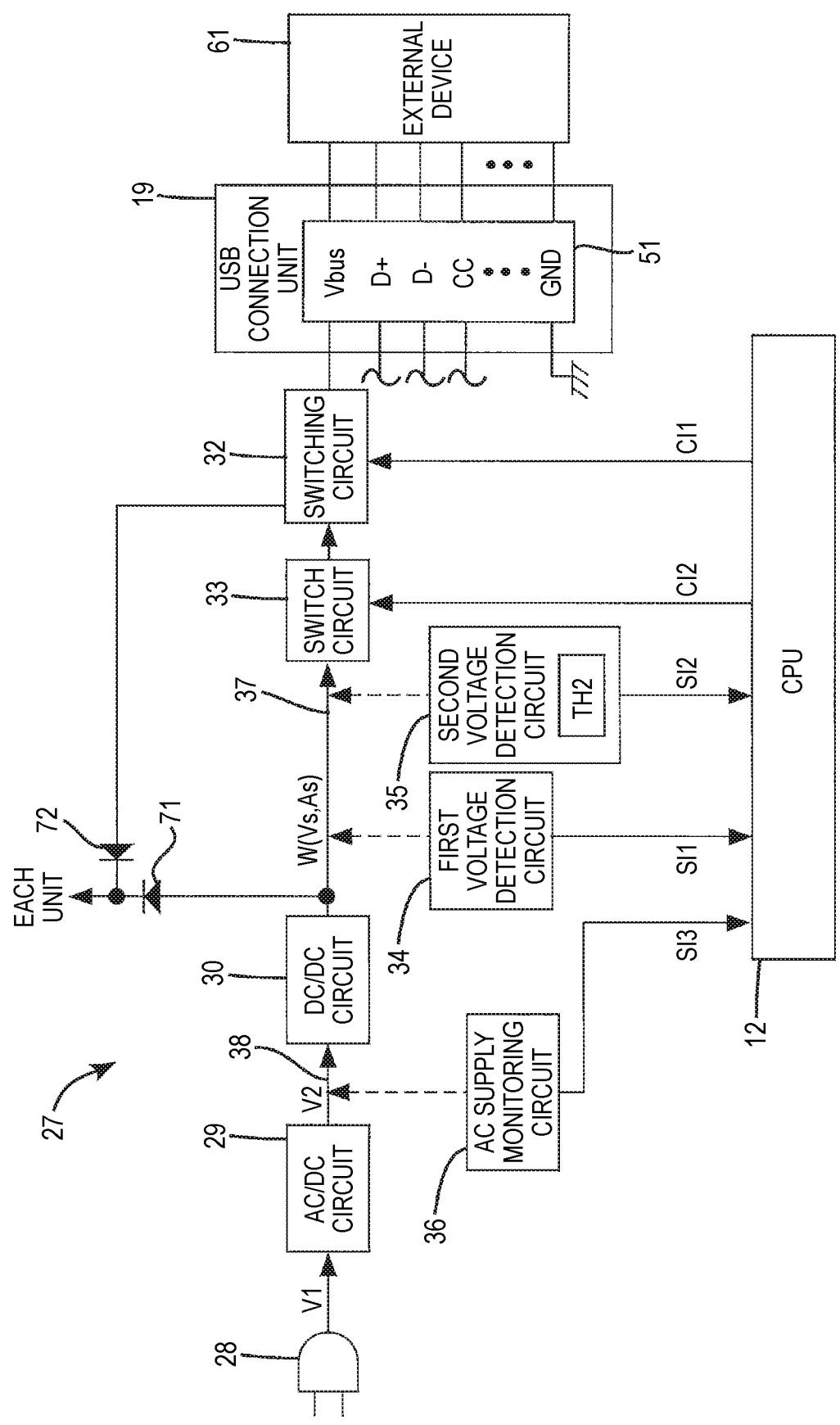
FIG. 2 is a block diagram depicting a configuration of a power supply unit in accordance with the embodiment.

Subsequently, the power supply unit 27 is described in detail. FIG. 2 depicts a configuration of the power supply unit 27. As shown in FIGS. 1 and 2, the power supply unit 27 includes a power supply cord 28, an AC/DC circuit 29, a DC/DC circuit 30, a battery 31 (refer to FIG. 1), a switching circuit 32, a switch circuit 33, a first voltage detection circuit 34, a second voltage detection circuit 35, an AC supply monitoring circuit 36, and the like. The AC/DC circuit 29 and the DC/DC circuit 30 function as a power processor. The AC/DC circuit 29 converts an AC voltage V1, which is received from an AC power supply via the power supply cord 28, into a DC voltage V2. A voltage value of the AC voltage V1 is, for example, 100V. A voltage value of the DC voltage V2 is, for example, 25V.

The DC/DC circuit 30 is connected to each unit in the printer 1 via a diode 71, and supplies electric power to each unit in the printer 1, The DC/DC circuit 30 is connected to the AC/DC circuit 29 via an electric power line 38, and converts the DC voltage V2 supplied from the AC/DC circuit 29 via the electric power line 38 or a DC voltage supplied from the battery 31 (refer to FIG. 1) into a DC voltage of a desired voltage value, and to supply electric power to each unit in the printer 1. Therefore, the printer 1 can be driven by the battery 31 even when the AC power supply is not connected thereto. The battery 31 can be charged by electric power generated from the AC/DC circuit 29 or electric power received from an external device via the USB connection unit 19.

The DC/DC circuit 30 generates the supply electric power W (the supply voltage Vs, the supply current As), which is supplied from the USB connection unit 19 to the external device 61, from the DC voltage V2 and the like. The DC/DC circuit 30 is connected to the switch circuit 33 via an electric power line 37. The switch circuit 33 is connected to the Vbus signal line of the receptacle 51 of the USB connection unit 19. In other words, the switch circuit 33 and the switching circuit 32 are connected between the DC/DC circuit 30 and the USB connection unit 19.

The switching circuit 32 is a circuit which switches a direction of electric power via the USB connection unit 19. The switching circuit 32 has, for example, a plurality of FETs (Field effect transistor), and turns on/off the plurality of FETs, based on a control signal CI1 input from the CPU 12, thereby switching electric power paths in the circuit. The switching circuit 32 is connected to each unit in the printer 1 via a diode 72. The switching circuit 32 switches a state (hereinbelow, also referred to as 'supply state') of connecting an electric power path for supplying electric power from the DC/DC circuit 30 to the external device 61 via the USB connection unit 19 and a state (hereinbelow, also referred to as 'electric power receiving state') of electing an electric power path for supplying electric power received from the external device 61 to each device via the diode 72, based on the control signal CI1. Therefore, the switching circuit 32 can switch a direction of electric power in the supply state and a direction of electric power in the electric power receiving state.

The switch circuit 33 switches connection between the DC/DC circuit 30 and the switching circuit 32 (USB connection unit 19), based on the control signal CI that is input from the CPU 12. The switch circuit 33 has, for example, a FET, and turns on/off the FET, based on the control signal CI2, thereby switching an on state where the DC/DC circuit 30 is connected to the switching circuit 32 and an off state where the DC/DC circuit 30 and the switching circuit 32 are disconnected. The CPU 12 sets the switch circuit 33 to the on state after activating the power supply unit 27 and sets the switch circuit 33 to the off state when an electric power abnormality is detected, as described later.

In the meantime, the switching circuit 32 and the switch circuit 33 of the present disclosure are not limited to the configuration of switching the connection by using the FET, and may also switch the connection by using another transistor such as a bipolar transistor or to switch the connection by turning on or off physically a relay. The switching circuit 32 may be connected to an input terminal of the DC/DC circuit 30 via the diode 72 or may be connected to a DC/DC circuit other than the DC/DC circuit 30. The electric power received from the external device 61 may be converted via the switching circuit 32 and the DC/DC circuit 30, and may be then supplied to each unit. The switch circuit 33 is not limited to the configuration of connecting or disconnecting the electric power line 37, and may have a variable resistor and may switch the supply electric power W supplied from the USB connection unit 19 to the external device 61 by reducing the supply electric power W without completely stopping the supply of electric power. The subject controlling the switching circuit 32 and the switch circuit 33 is not limited to the CPU 12 and may also be the electric power controller 25.

The first voltage detection circuit 34 outputs, to the CPU 12, a first detection signal SI1 corresponding to a magnitude of the supply voltage Vs that flows through the electric power line 37. The second voltage detection circuit 35 outputs, to the CPU 12, a second detection signal SI2 corresponding to a magnitude of the supply voltage Vs that flows through the electric power line 37. The configurations of the first and second voltage detection circuits 34 and 35 are not particularly limited and may be identical or different from each other.

The configurations of the first and second voltage detection circuits 34 and 35 of the present embodiment are different from each other. The first voltage detection circuit 34 outputs information indicating a magnitude of the voltage value of the supply voltage Vs to the CPU 12, as the first detection signal SI1, based on a voltage applied to an internal resistor connected in parallel with the electric power line 37, for example. The CPU 12 determines an electric power abnormality of the supply electric power W by comparing the voltage value of the supply voltage Vs indicated by the first detection signal SI1 input from the first voltage detection circuit 34 and the first threshold value TH1 read out from the NVRAM 15. Therefore, in determination processing of determining an electric power abnormality by using the first threshold value TH1, the CPU 12 executes comparison process sing with the first threshold value TH1. The determination processing of determining an electric power abnormality by using the first threshold value TH1 will be described in detail later (S11 in FIG. 4).

A data format of the first detection signal SI1 is not particularly limited. For example, the first detection signal SI1 may be a bit value indicating the voltage value of the supply voltage Vs as a numerical value. The first detection signal SI1 may be a numerical value indicating stepwise a magnitude of the supply voltage Vs.

The second voltage detection circuit 35 compares the magnitude of the voltage value of the supply voltage Vs with a second threshold value TH2, based on a voltage applied to an internal resistor connected in parallel with the electric power line 37, and to output a result of the comparison to the CPU 12, as the second detection signal SI2, for example. Therefore, in determination processing of determining an electric power abnormality by using the second threshold value TH2, the second voltage detection circuit 35 executes the comparison processing with the second threshold value TH2. The determination processing of determining an electric power abnormality by using the second threshold value TH2 will be described in detail later (S11 in FIG. 4).

The AC supply monitoring circuit 36 outputs a third detection signal SI3 corresponding to a voltage value on the electric power line 38 for connecting the AC/DC circuit 29 and the DC/DC circuit 30 each other. The AC supply monitoring circuit 36 outputs information indicating a magnitude of the voltage value of the DC voltage V2 to the CPU 12, as the third detection signal SI3, based on a voltage applied to an internal resistor connected in parallel with the electric power line 38, for example. The CPU 12 determines an abnormality of the AC power supply by comparing the voltage value of the DC voltage V2 indicated by the third detection signal SI3 input from the AC supply monitoring circuit 36 and the third threshold value TH3 in the NVRAM 15. Therefore, in determination processing of determining an electric power abnormality of the AC power supply by using the third threshold value TH3, the CPU 12 executes comparison processing with the third threshold value TH3. The determination processing of determining an electric power abnormality by using the third threshold value TH3 will be described in detail later (S11 in FIG. 4). In the meantime, a data format of the third detection signal SI3 is not particularly limited. For example, the third detection signal SI3 may also be a bit value indicating the voltage value of the DC voltage V2 as a numerical value.

In the meantime, the connection configuration shown in FIG. 2 is an example. In FIG. 2, the connection of each circuit is simplified so as to avoid complication of the drawing. For example, the DC/DC circuit 30 and each unit in the printer 1 may also be connected to each other by a plurality of electric power lines (an electric power line for each voltage value, and the like). The electric power line for connecting the DC/DC circuit 30 and each unit each other and the electric power line 37 for connecting the DC/DC circuit 30 and the switch circuit 33 each other may also be separate electric power lines.

(3. Mode Information 45)

Subsequently, the mode information 45 stored in the NVRAM 15 is described. FIG. 3 depicts contents of the mode information 45. For example, the printer 1 of the present embodiment has a plurality of modes of a low power consumption mode, a standby mode, a scan mode, a print mode, and a copy mode.

The standby mode is a mode where the printer 1 is in a standby state and the power consumption is reduced. When it is detected that there is no execution request for a next job (a print job or a scan job) or user's input operation via the touch panel of the user interface 20 for a predetermined time period after completing print processing or scan processing, for example, the printer 1 shifts to the standby mode. When the printer 1 shifts to the standby mode, the printer 1 stops energization to the thermal head of the image forming unit 16 or to the image sensor of the image scanning unit 17, and turns off the backlight of the display panel of the user interface 20 for non-display, thereby reducing the power consumption, for example.

The low power consumption mode is a mode where the power consumption is more reduced than the standby mode. When there is no execution request for a job or user's input operation for a predetermined time period after shifting to the standby mode, for example, the printer 1 shifts to the low power consumption mode for further saving electric power. In the low power consumption mode, the printer 1 causes only some of the power supply unit 27 to operate and stops the supply of electric power to the image forming unit 16 and the image scanning unit 17, for example, thereby saving electric power.

The scan mode is a mode where the scan function is enabled, for example. In the scan mode, the printer 1 keeps the supply of electric power to the image scanning unit 17, for example, and is thus in a state where scan can be immediately executed when a scan job is received. In the scan mode, the printer 1 reduces the supply of electric power to the image forming unit 16, for example, and is thus in a disabled state where the print function cannot be executed. In contrast, the print mode is a mode where the print function is enabled and the scan mode is disabled, for example.

The copy mode is a mode where both the scan function and the copy function are enabled, for example. In the copy mode, the printer 1 keeps the supply of electric power to the image forming unit 16 and the image scanning unit 17, for example. In the copy mode, the printer 1 enables the copy function using the image forming unit 16 and the image scanning unit 17, in addition to a scan job and a print job.

As shown in FIG. 3, the power consumption in each mode increases to 3 W, 10 W, 40 W, 70 W and 90 W in order of the low power consumption mode, the standby mode, the scan mode, the print mode and the copy mode. This is because as the number of enabled functions increases, the units to which electric power is supplied increases. The printer 1 of the present embodiment receives in advance, from the user, a setting of a mode (hereinbelow, also referred to as the mode to be operated) that, when an electric power abnormality is detected, is to be operated after the detection. The printer 1 receives a selection of one or more modes to be operated, for example. The method of receiving the mode to be operated is not particularly limited. For example, the printer 1 may receive the mode to be operated, based on an operation input on the user interface 20. Alternatively, the printer 1 may receive a setting value from a PC connected to the communication unit 24, thereby setting the mode to be operated.

As shown in FIG. 3, in the mode information 45, requesting electric power of a swap request is set for each mode. As described later, the requesting electric power of the swap request is electric power that is requested by the swap request after an electric power abnormality occurs, and is electric power required to operate in each mode. The requesting electric power is an example of the first electric power of the present invention. The printer 1 requests electric power from the external device 61 in the swap request, based on the mode information 45.

For example, the power consumption in the low power consumption mode is 3 W. In the meantime, in the electric power transfer via the USB connection unit 19 of the present embodiment, electric power of 10 W (5V, 2 A) or higher can be requested to an electric power host, for example. For this reason, when the low power consumption mode is set as the mode to be operated, for example, the printer 1 requests the requesting electric power of 10 W or higher in the swap request although 3 W is sufficient from a standpoint of reducing consumption of electric power. When the standby mode is set as the mode to be operated, the printer 1 requests the requesting electric power (10 W), which is the same as the power consumption (10 W), in the swap request. Similarly, when each of the scan mode, the print mode and the copy mode is set as the mode to be operated, the printer 1 requests the requesting electric power, which is the same as the power consumption (40 W, 70 W, 90 W), in the swap request.

(4. Swap Request Transmission Processing)

Subsequently, swap request transmission processing of transmitting a swap request by the CPU 12 of the present embodiment is described with reference to FIGS. 4 to 6. When the CPU 12 executes negotiation with the external device 61, functions as an electric power source as a result of the negotiation and starts the supply of electric power to the external device 61, for example, the CPU 12 starts the swap request transmission processing shown in FIGS. 4 to 6. The CPU 12 executes the swap request transmission processing to transmit the swap request to the external device 61, which is an electric power sink, based on occurrence of an electric power abnormality, and requests electric power corresponding to a state of the electric power abnormality.

Figure 4:
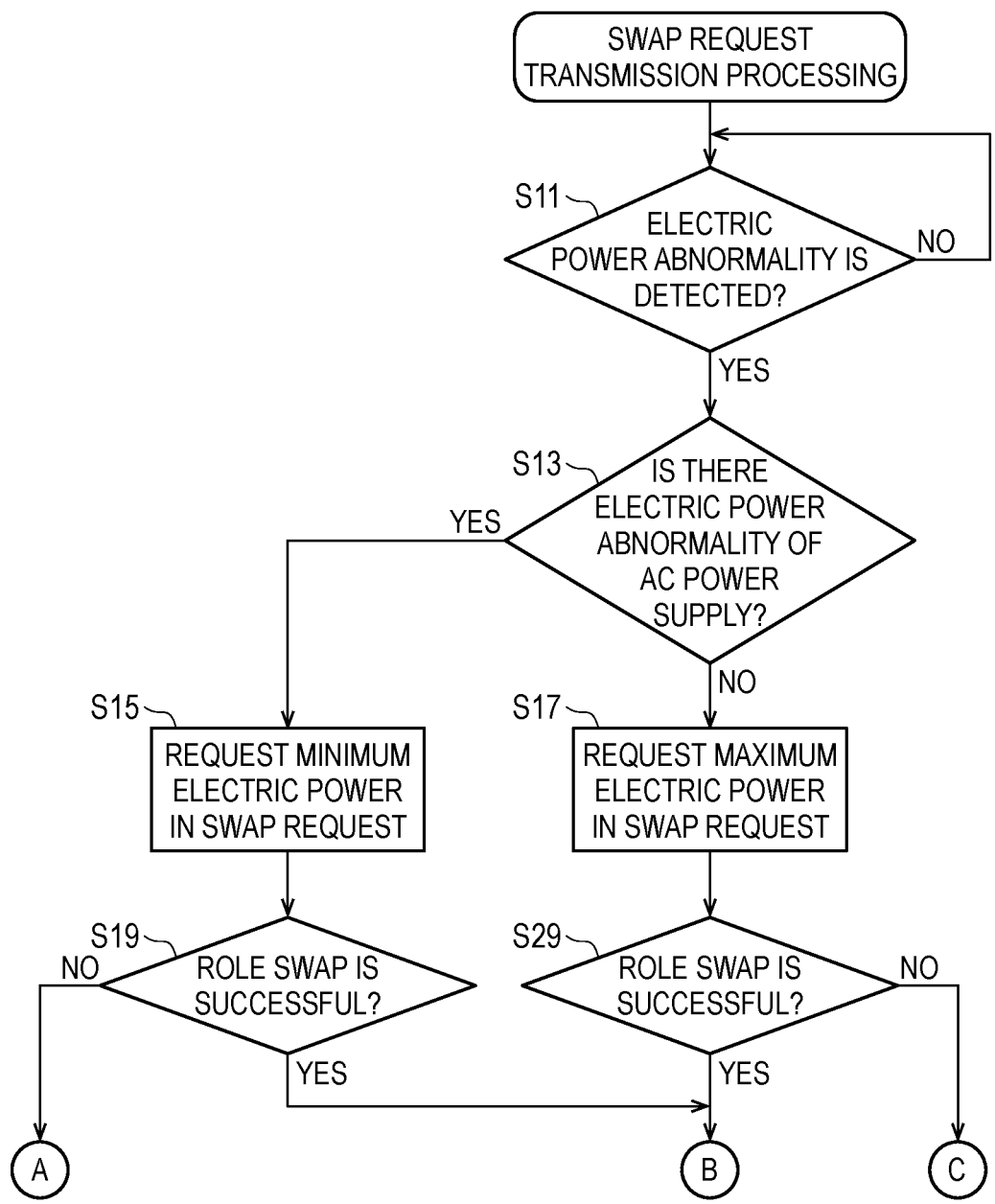
FIG. 4 is a flowchart depicting contents of swap request transmission processing in accordance with the embodiment.
Figure 5:
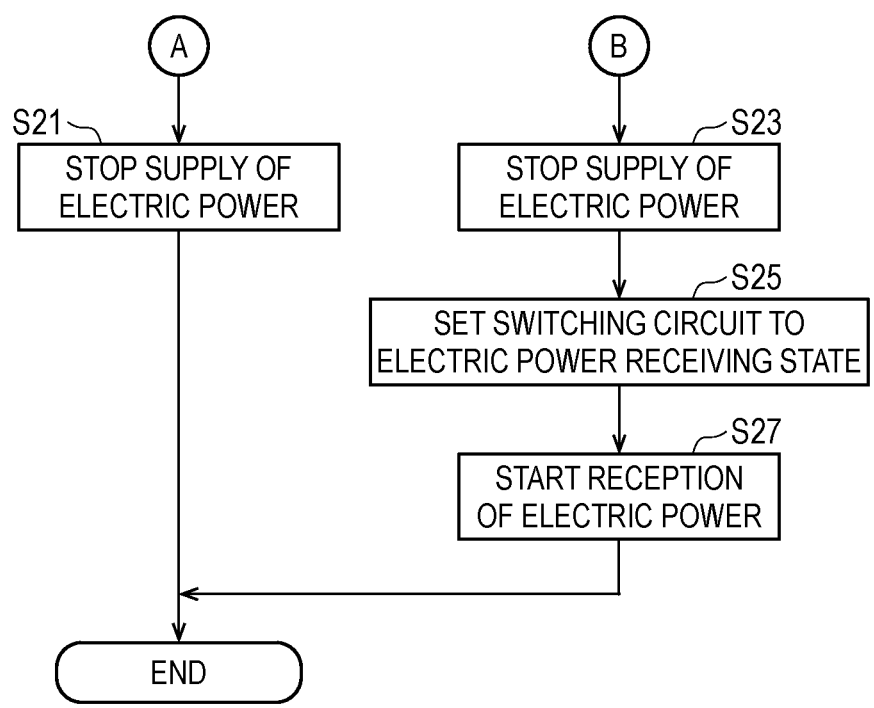
FIG. 5 is a flowchart depicting contents of the swap request transmission processing in accordance with the embodiment.
Figure 6:
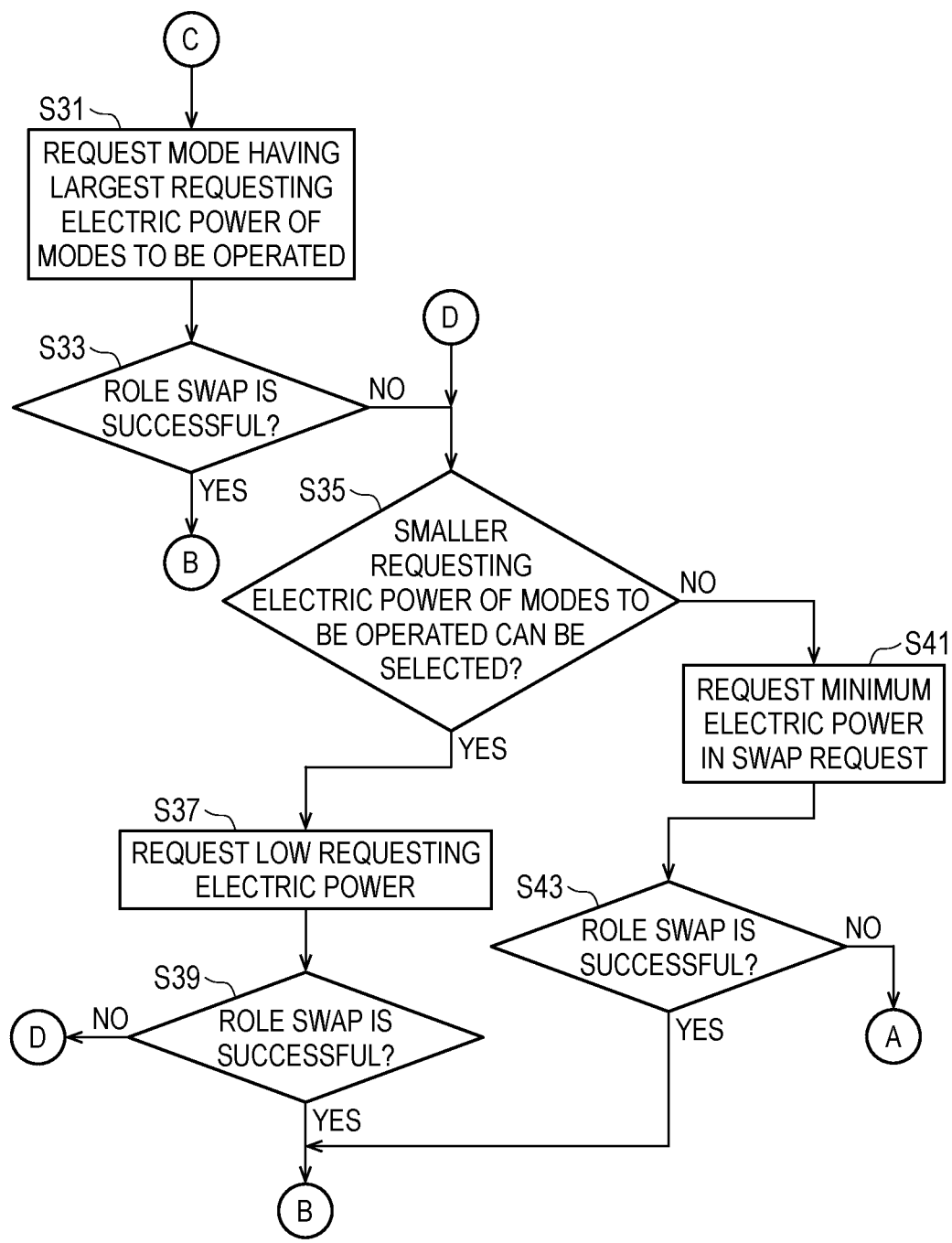
FIG. 6 is a flowchart depicting contents of the swap request transmission processing in accordance with the embodiment.

In the meantime, the condition for starting the swap request transmission processing shown in FIGS. 4 to 6 is not limited to the condition for starting the supply of electric power. For example, the CPU 12 may start the swap request transmission processing at the time when the power supply unit 27 is activated to start the supply of electric power. The flowcharts of the specification indicate processing of the CPU 12 according to commands described in the program. That is, in descriptions below, the processing such as "determination", "transmission", "selection" and the like indicates the processing of the CPU 12. The swap request transmission processing shown in FIGS. 4 to 6 may also be executed by a unit other than the CPU 12. For example, the electric power controller 25 may execute the program PG to execute the swap request transmission processing shown in FIGS. 4 to 6.

First, in step (hereinbelow, simply denoted as "S") 11 in FIG. 4, the CPU 12 determines whether an electric power abnormality is detected. The CPU 12 detects an electric power abnormality, based on the first detection signal SI1 of the first voltage detection circuit 34, the second detection signal SI2 of the second voltage detection circuit 35 and the third detection signal SI3 of the AC supply monitoring circuit 36. When an electric power abnormality is detected in at least one of the first to third detection signals SI1 to SI3, for example, i.e., when it is determined that an electric power abnormality is detected by at least one of the first voltage detection circuit 34, the second voltage detection circuit 35, and the AC supply monitoring circuit 36, the CPU 12 makes an affirmative determination in S11 (S11: YES), and executes S13. When an electric power abnormality is not detected in all of the first voltage detection circuit 34, the second voltage detection circuit 35, and the AC supply monitoring circuit 36 (S11: NO), the CPU 12 repeatedly executes the determination processing of S11. Therefore, the CPU 12 monitors an electric power abnormality all the time during the supply of electric power to the external device 61. In the meantime, the CPU 12 may also make an affirmative determination in S11 only when an electric power abnormality is detected in two circuits of the first voltage detection circuit 34, the second voltage detection circuit 35 and the AC supply monitoring circuit 36 or an electric power abnormality is detected in all the circuits.

First, processing of detecting an electric power abnormality of the supply electric power W by using the first voltage detection circuit 34 is described. As used herein, the electric power abnormality of the supply electric power W indicates a state where the supply electric power W becomes equal to or smaller than a predetermined minimum electric power, a case where the supply electric power W (the supply voltage Vs or the supply current As) equal to or larger than supply electric power (PDO) decided in negotiation occurs, and the like, for example. For the first threshold value TH1, for example, a lower limit value at which an electric power abnormality below the minimum electric power can be detected and an upper limit value at which an electric power abnormality above the PDO can be detected are set. For example, for the first threshold value TH1, a minimum voltage value (5V or the like) that can be supplied by USB PD is set as the lower limit value. The CPU 12 may set a voltage value of the supply voltage Vs of the electric power (PDO) that is actually supplied, a voltage value higher than the voltage value by several V or a maximum voltage value (20V or the like) that can be supplied by USB PD, as the upper limit value of the first threshold value TH1, based on a result of negotiation, for example.

In S11, when the voltage value of the supply voltage Vs indicated by the first detection signal SI1 becomes equal to or smaller than the lower limit value (5V or the like) of the first threshold value TH1, for example, the CPU 12 determines that an electric power abnormality has occurred (S11: YES). When the voltage value of the supply voltage Vs indicated by the first detection signal SI1 becomes equal to or greater than the upper limit value (the voltage value of the supply voltage Vs decided in negotiation, or the like) of the first threshold value TH1, for example, the CPU 12 determines that an electric power abnormality has occurred (S11: YES). Thereby, the CPU 12 can detect an electric power abnormality when the supply electric power W exceeds a range from the lower limit value to the upper limit value. In the meantime, the CPU 12 may determine only whether the voltage value is below the lower limit value or only whether the voltage value is above the upper limit value.

Subsequently, processing of detecting the electric power abnormality of the supply electric power W by using the second voltage detection circuit 35 is described. The second threshold value TH2 is, for example, a voltage value of a maximum electric power allowed to be supplied from the USB connection unit 19 or a value based on the voltage value, and a voltage value of 20V or higher is set, for example. The second voltage detection circuit 35 has a comparison circuit which compares the supply voltage Vs with the second threshold value TH2, for example. When the supply voltage Vs is lower than the second threshold value TH2, the second voltage detection circuit 35 outputs the second detection signal SI2 of a low level to the CPU 12, and when the supply voltage Vs is equal to or higher than the second threshold value TH2, the second voltage detection circuit 35 outputs the second detection signal SI2 of a high level to the CPU 12. The configuration of the second voltage detection circuit 35 is not particularly limited. The second voltage detection circuit 35 may also compare the supply voltage Vs with the second threshold value TH2 by software processing of the CPU or the like, without using the hardware such as the comparison circuit. The second voltage detection circuit 35 may output a difference (a positive voltage value or a negative voltage value) between the supply voltage Vs and the second threshold value TH2 to the CPU 12, as the second detection signal SI2. When the second detection signal SI2 of a high level is input from the second voltage detection circuit 35, for example, the CPU 12 determines in S11 that an electric power abnormality has occurred.

Subsequently, processing of detecting an electric power abnormality of the AC power supply by using the AC supply monitoring circuit 36 is described. As used herein, the electric power abnormality of the AC power supply indicates a state where the power supply cord 28 is unplugged from an AC port (also referred to as AC outlet) and the DC voltage V becomes 0V, a case where the AC voltage V1 is equal to or higher than 100V due to an abnormality of the AC power supply, and the like, for example. For the third threshold value TH3, for example, a minimum voltage value (0V or the like) and a maximum voltage value (a value equal to or higher than 25V, or the like) are set. In S11, when a voltage value of the DC voltage V2 indicated by the third detection signal SI3 is equal to or smaller than the minimum voltage value indicated by the third threshold value TH3 or is equal to or greater than the maximum voltage value, for example, the CPU 12 determines that an electric power abnormality has occurred (S11: YES). Thereby, the CPU 12 can detect an electric power abnormality when electric power supplied from the AC power supply exceeds a range from the predetermined minimum voltage value to the maximum voltage value. In the meantime, the CPU 12 may determine only whether the voltage value is below the minimum voltage value or only whether the voltage value is above the maximum voltage value. The contents of the determination processing are an example. For example, the first threshold value TH1 and the second threshold value TH2 may be the same value. As the first threshold value TH1, 0V or 100V may also be set.

In S11, when an electric power abnormality is detected (S11: YES), the CPU 12 determines whether there is an electric power abnormality of the AC power supply (S13). Herein, when the printer 1 cannot receive electric power from the AC power supply, a possibility of deficiency in electric power is high. On the other hand, when an electric power abnormality occurs in a power supply other than the AC power supply and electric power can be received from the AC power supply, there is a possibility that the printer 1 can secure electric power by drive charging the battery 31, for example. In this case, if electric power is requested to the external device 61 beyond necessity, a load of the external device 61 on the supply of electric power increases. Therefore, the printer 1 of the present embodiment requests the minimum electric power allowed to be requested in the swap request from the external device 61, when there is no electric power abnormality of the AC power supply, for example, when there is a high possibility that a power supply can be secured in the own device. On the other hand, the printer 1 requests the maximum electric power allowed to be requested in the swap request from the external device 61, when there is an electric power abnormality of the AC power supply, for example, when there is a high possibility that the own device falls into a state of deficiency in electric power.

When an electric power abnormality is detected by the third detection signal SI3 of the AC supply monitoring circuit 36 in S13, for example, the CPU 12 determines that there is a power supply abnormality of the AC power supply (S13: YES), and executes S17. On the other hand, when an electric power abnormality is not detected by the AC supply monitoring circuit 36 (when an electric power abnormality is detected in the first voltage detection circuit 34 or the second voltage detection circuit 35) in S13, the CPU 12 determines that there is no electric power abnormality of the AC power supply (S13: NO), and executes S15.

In S15, the CPU 12 transmits a swap request to the external device 61 to request a supply of the minimum electric power. The swap request is a request for swapping an electric power role of an electric power source and an electric power role of an electric power sink mutually (hereinbelow, also referred to as 'role swap'). The electric power role swap request can be transmitted and received by a method that complies with Power Role Swap or Fast Power Role Swap defined in USB PD standards, for example. When information indicating that the role swap is accepted is received from the external device 61, the CPU 12 controls the electric power controller 25 to cause the receptacle 51 to function as an electric power sink. The CPU 12 controls the electric power controller 25 to execute negotiation with the external device 61 for reception of electric power. The CPU 12 requests a combination of a voltage value and a current value corresponding to the minimum electric power from the electric power list received from the external device 61. As described above, in the electric power transfer via the USB connection unit 19 of the present embodiment, electric power can be transferred within a range of electric power from 10 W (5V, 2 A) to 100 W (20V, 5 A), for example. In this case, the minimum electric power that can be requested to the electric power host is 10 W. The CPU 12 requests 10 W, as the minimum electric power.

After executing S15, the CPU 12 executes S19. In S19, the CPU 12 determines whether the role swap is successful. The CPU 12 makes an affirmative determination in S19 (S19: YES) when the CPU receives the information indicating the role swap is accepted is received, executes negotiation for requesting a supply of the minimum electric power to the external device 61 and receives information indicating that the request is accepted from the external device 61, for example. Thereby, it is possible to receive the minimum electric power from the external device 61.

On the other hand, for example, when information indicating that the swap request of S15 is rejected is received, i.e., when the execution of the role swap is rejected, the CPU 12 makes a negative determination in S19 (S19: NO). For example, when there is no combination of the voltage value and the current value corresponding to the minimum electric power (10 W) in the electric power list received from the external device 61, the CPU 12 makes a negative determination in S19. When there is a combination of the minimum electric power in the electric power list and the minimum electric power is requested but information indicating rejection of the request is received, for example, the CPU 12 makes a negative determination in S19 (S19: NO). When the CPU 12 makes a negative determination in S19 (S19: NO), the CPU 12 executes S21 of FIG. 5.

In the meantime, the minimum electric power of the present disclosure is not limited to the value based on the minimum electric power allowed to be transferred via the USB connection unit 19. For example, the CPU 12 may request, as the minimum electric power, a combination of a voltage value and a current value, which is the minimum electric power, from the electric power list received from the external device 61.

In S21, the CPU 12 stops the supply of electric power. For example, the CPU 12 sets the switch circuit 33 to the off state to disconnect the DC/DC circuit 30 and the switching circuit 32, thereby stopping the supply of electric power. Thereby, the electric power transfer with the external device 61 is stopped. When the CPU 12 executes S21, the processing shown in FIGS. 4 to 6 is over. Therefore, the printer 1 of the present embodiment notifies the swap request at the time when the electric power abnormality occurs, and stops the supply of electric power and ends the processing if electric power cannot be received even though the minimum electric power is requested to the external device 61. In the meantime, before setting the switch circuit 33 to the off state in S21, the CPU 12 may transmit a reset signal for notifying that the supply of electric power will be stopped to the external device 61 via USB PD communication. The CPU 12 may execute an error notification of displaying, on the user interface 20, an error message indicating that the electric power abnormality has occurred or that electric power cannot be received from the external device 61.

When the CPU 12 makes an affirmative determination in S19 (S19: YES), the CPU 12 executes S23 of FIG. 5. When S23 is executed, the role swap is successful. In this case, the external device 61 swaps its role to an electric power source and supplies, to the printer 1, electric power (the minimum electric power or the like) requested from the printer 1.

Specifically, in S23, the CPU 12 sets the switch circuit 33 to the off state to disconnect the DC/DC circuit 30 and the switching circuit 32, thereby stopping the supply of electric power. After executing S23, the CPU 12 controls the switching circuit 32 to switch the direction of electric power so as to change from the power supply state to the power reception state (S25). In the meantime, after receiving the request for the minimum electric power in S15 from the printer 1 and notifying the information indicating that the request is accepted, the external device 61 starts the supply of electric power to the printer 1. Then, the CPU 12 starts reception of the minimum electric power from the external device 61 (S27).

In this way, according to the printer 1 of the present embodiment, before stopping the supply of electric power at the time when the electric power abnormality occurs, the swap request is notified and the role swap is executed, so that the electric power transfer via the USB connection unit 19 (Vbus signal line) is not stopped or is temporarily stopped and is then resumed immediately. Thereby, the USB connection with the external device 61 via the USB connection unit 19 can be maintained, so that it is possible to continuously perform USB communication. The printer 1 can supply the electric power received from the external device 61 via the USB connection unit 19 to each unit in the printer 1. After executing S27, the CPU 12 ends the processing shown in FIGS. 4 to 6.

In S17 of FIG. 4, the CPU 12 transmits the swap request to the external device 61, and requests the maximum electric power, similar to S15. When the information indicating that the role swap is accepted is received from the external device 61, the CPU 12 executes negotiation with the external device 61 for reception of electric power. In the electric power transfer of the present embodiment, electric power transfer can be performed within the range of electric power from 10 W to 100 W, for example. In this case, the maximum electric power that can be requested to the electric power host is 100 W. The CPU 12 requests 100 W, as the maximum electric power.

After executing S17, the CPU 12 executes S29. In S29, the CPU 12 determines whether the role swap is successful. When the CPU 12 receives the information indicating that the role swap is accepted, executes negotiation for requesting a supply of the maximum electric power to the external device 61 and receives the information indicating that the request is accepted from the external device 61, for example, the CPU 12 makes an affirmative determination in S29 (S29: YES).

When the CPU 12 makes an affirmative determination in S29, the CPU executes S23 and thereafter of FIG. 5. As described above, the CPU 12 sets the switch circuit 33 to the off state (S23), switches the switching circuit 32 to the electric power receiving state (S25), and starts reception of electric power (S27). Thereby, while maintaining USB communication with the external device 61, it is possible to start reception of the maximum electric power from the external device 61.

On the other hand, for example, when the information indicating that the swap request of S17 is rejected is received, i.e., when the execution of the role swap is rejected, the CPU 12 makes a negative determination in S29 (S29: NO). For example, when there is no combination of the voltage value and the current value corresponding to the maximum electric power (100 W) in the electric power list received from the external device 61, the CPU 12 makes a negative determination in S29. For example, when there is a combination of the maximum electric power in the electric power list and the maximum electric power is requested but the information indicating rejection of the request is received, the CPU 12 makes a negative determination in S29 (S19: NO). When the CPU 12 makes a negative determination in S29 (S29: NO), the CPU 12 executes S31 of FIG. 6.

In the meantime, the maximum electric power is not limited to the value based on the maximum electric power allowed to be transferred via the USB connection unit 19. For example, the CPU 12 may request, as the maximum electric power, a combination of a voltage value and a current value, which is the largest electric power, from the electric power list received from the external device 61.

In S31, the CPU 12 executes the swap request for requesting a mode having the maximum requesting electric power of the modes to be operated set by the user. As described above, the printer 1 of the present embodiment can receive a plurality of modes that, when an electric power abnormality is detected, are to be operated after the detection. For example, it is assumed that three modes of the copy mode, the print mode and the scan mode are received as the mode to be operated. In this case, as shown in FIG. 3, the requesting electric power of the copy mode, the print mode and the scan mode are respectively 90 W, 70 W and 40 W. Therefore, the CPU 12 executes the swap request for requesting the requesting electric power (90 W) of the copy mode that has the maximum requesting electric power of the modes to be operated.

In S31, the CPU 12 transmits the swap request to the external device 61 and requests the maximum requesting electric power, similar to S17. After executing S31, the CPU 12 determines whether the role swap is successful, similar to S29 (S33). Therefore, the CPU 12 of the present embodiment again notifies the swap request for the maximum requesting electric power in S31 after notifying the swap request for the maximum electric power in S17. Thereby, even when the power supply state of the external device 61 changes and the contents (combination of electric power) of the electric power list are changed after S17 is executed until S31 is executed, it is possible to acquire and determine the latest electric power list from the external device 61. On the other hand, the CPU 12 may not acquire the electric power list in S31. For example, the CPU 12 may determine whether it is possible to request the maximum requesting electric power, based on the electric power list acquired in S17, and may request the same.

When the CPU 12 receives the information indicating that the role swap is accepted and receives the information indicating that reception of the maximum requesting electric power is accepted from the external device 61, the CPU 12 makes an affirmative determination in S33 (S33: YES). The CPU 12 executes S23 and thereafter of FIG. 5, and starts reception of the maximum requesting electric power while maintaining USB communication (S23, S25 and S27). Thereby, it is possible to secure electric power, which is required to execute a mode having the largest requesting electric power, of the modes to be operated preset by the user, and to shift to a desired mode.

On the other hand, when it is determined in S33 that the role swap fails (S33: NO), the CPU 12 determines whether it is possible to select the smaller requesting electric power in the modes to be operated set by the user (S35). As described above, in the case where the three modes of the copy mode, the print mode and the scan mode are set as the modes to be operated, the print mode has the second largest requesting electric power after the copy mode (refer to FIG. 3). In this case, the CPU 12 makes an affirmative determination in S35 (S35: YES), and executes the swap request for requesting the requesting electric power (70 W) of the print mode (S37).

Similar to S31, the CPU 12 executes processing of transmitting the swap request to the external device 61 and selecting and requesting the requesting electric power of the print mode from the electric power list (S37). After executing S37, the CPU 12 determines whether the role swap is successful (S39). When it is determined that the role swap is successful (S39: YES), the CPU 12 executes S23 and thereafter in FIG. 5 and receives electric power of the second largest requesting electric power (S23, S25 and S27). Thereby, it is possible to shift the mode, which has the second largest requesting electric power, of the modes to be operated preset by the user.

On the other hand, when it is determined in S39 that the role swap fails (S39: NO), the CPU 12 again executes the processing from S35. Thereby, the CPU 12 sequentially executes the swap request in descending order of the requesting electric power with respect to the plurality of modes to be operated set by the user, and attempts to receive electric power from the external device 61. In the meantime, the CPU 12 may execute the swap request only once by collectively comparing the electric power list acquired in S17 or S31 and the requesting electric power of the plurality of modes to be operated.

In S31 and S37, when the same value of electric power as the requesting electric power is not included in the electric power list, the CPU 12 may request a supply of electric power that is equal to or larger than the requesting electric power and is closer to the requesting electric power. For example, when requesting 40 W of the scan mode, if only a combination of 60 W and 50 W is included in the electric power list, the CPU 12 may request 50 W closer to 40 W. Alternatively, the CPU 12 may also select electric power that can be converted by the DC/DC circuit 30, i.e., can be used as an input voltage of the DC/DC circuit 30. For example, in a case where the DC/DC circuit 30 can convert 60 W into 40 W, the CPU 12 may request 60 W.

When the CPU 12 executes S37 and S39 for each of the plurality of modes to be operated set by the user but fails in role swap and there is no selectable mode as a result of re-execution of S35, the CPU 12 makes a negative determination in S35 (S35). When only one mode is set as the mode to be operated, the CPU 12 may execute the swap request for the one mode in S31 and determine whether the swap request is successful in S33, for example. When the CPU 12 makes a negative determination in S33, the CPU 12 may make a negative determination in S35 because it is not possible to select another mode (S35: NO).

When the CPU 12 makes a negative determination in S35 (S35: NO), the CPU 12 executes the swap request for requesting the minimum electric power (for example, 10 W), similar to S15 (S41), Therefore, when the CPU 12 of the present embodiment fails in role swap with respect to the modes to be operated set by the user, the CPU 12 requests the minimum electric power, which can be received, from the external device 61. After executing S41, the CPU 12 determines whether the role swap is successful (S43).

When it is determined in S43 that the role swap is successful (S43: YES), the CPU 12 executes S23 and thereafter, and receives electric power of the minimum electric power (S23, S25 and S27). Thereby, when it is not possible to secure the electric power of the modes to be operated set by the user, it is possible to secure the minimum electric power.

On the other hand, when it is determined in S43 that the role swap fails (S43: NO), the CPU 12 executes S21 of FIG. 5. The CPU 12 sets the switch circuit 33 to the off state to disconnect the DC/DC circuit 30 and the switching circuit 32, thereby stopping the supply of electric power (S21). In this way, the CPU 12 of the present embodiment can continuously to perform USB communication by executing the role swap before stopping the supply of electric power. It is possible to secure more suitable electric power by changing electric power requested in the swap request, depending on the abnormal state of the AC power supply and the modes to be operated set by the user.

In the meantime, as shown in FIG. 3, in the present embodiment, the requesting electric power of the low power consumption mode and the standby mode are the same as the minimum electric power (10 W). For this reason, when the standby mode or the low power consumption mode is selected as the mode to be operated, for example, the CPU 12 may execute S35 after making a negative determination in S29 of FIG. 4 (S29: NO). That is, the processing of S31, S33, S35 and the like may be omitted. Thereby, it is possible to suppress a situation where the requesting electric power, which is the same as the minimum electric power, is requested more than once. In the meantime, since the power supply state of the external device 61 may change, the swap request for the requesting electric power (10 W) of the standby mode may be executed in S31 and the swap request for the minimum electric power (10 W) may be further executed in S35, for example.

The CPU 12 may change the requesting electric power, based on a standard other than electric power. For example, the CPU 12 may receive priorities of the modes to be operated from the user. The CPU 12 may execute the swap request for the requesting electric power in order from the mode with a higher priority.

For reference, the printer 1 is an example of the information processing apparatus. The CPU 12 is an example of the controller. The USB connection unit 19 and the receptacle 51 are examples of the interface. The AC/DC circuit 29 and the DC/DC circuit 30 are examples of the power supply. The switching circuit 32 is an example of the electric power switching unit. The switch circuit 33 is an example of the switch. The first voltage detection circuit 34 and the second voltage detection circuit 35 are examples of the detector. The AC supply monitoring circuit 36 is an example of the detector and the AC detector. The first detection signal SI1, the second detection signal SI2 and the third detection signal SI3 are examples of the detection value. S15, S17, S31, S37 and S41 are examples of the notification process.

(5. Effects)

According to the embodiment, following effects are achieved.

(1) When the detection value of the detector (at least one of the first voltage detection circuit 34 and the second voltage detection circuit 35 and the AC supply monitoring circuit 36) indicates an abnormal value (S11: YES) while the electric power is supplied to the external device 61 via the USB connection unit 19, the printer 1 of the CPU 12 of the present embodiment executes the processing (an example of the notification processing) of S15, S17, S31, S37 and S41 of notifying the swap request for swapping the electric power roles with the external device 61 to the external device 61 via the USB connection unit 19.

According to this configuration, when an electric power abnormality occurs while the electric power is supplied to the external device 61 functioning as an electric power source, the swap request is notified to the external device 61 to swap an electric power source and an electric power sink. The external device 61 is requested to be an electric power source, so that the electric power can be received from the external device 61. It is possible to continuously perform communication with the external device 61.

Herein, a case where the supply of electric power is stopped without notifying the swap request at the time when the electric power abnormality occurs is considered. For example, when an electric power abnormality occurs and the switch circuit 33 is set to the off state, the Vbus signal line is cut off. When the Vbus signal line is cut off, the electric power controller 25 may determine that USB connection is unconnected and may not execute control on USB communication, i.e., USB communication may be disconnected. This is because if control processing relating to communication of USB PD has a continuation condition of processing as to whether the Vbus signal line is connected, communication is disconnected. As a result, even if it is possible to secure power supplies of separate systems for an electric power source and an electric power sink, communication cannot be restored unless the Vbus signal line is again activated (unless prescribed electric power or higher is transferred with the Vbus signal line).

When the Vbus signal line is cut off, the supply of electric power from an electric power source is stopped. As a result, an electric power sink falls into a state of deficiency in electric power, so that the system is stopped and USB communication cannot be executed, for example. In this case, even if the electric power sink has an independent power supply, when the electric power host cuts off the Vbus signal line, communication is disconnected.

In contrast, when an electric power abnormality occurs, the CPU 12 of the present embodiment first notifies the swap request and executes the role swap before setting the switch circuit 33 to the off state to cut off the Vbus signal line. Thereby, if the role swap succeeds, even when the printer 1 that was originally an electric power source sets the switch circuit 33 to the off state to cut off the Vbus signal line (S23), the external device 61 that became newly an electric power source supplies electric power to the Vbus signal line, so that the Vbus signal line can be maintained activated. Therefore, when an electric power abnormality occurs, it is possible to continuously perform USB communication without disconnecting the same.

(2) In the processing of S31 and S37, the CPU 12 notifies the swap request, which requests a supply of the requesting electric power (an example of the first electric power) corresponding to the mode to be operated, to the external device 61 via the USB connection unit 19. According to this configuration, the CPU 12 requests the external device 61 to supply the first electric power by the swap request. Thereby, it is possible to receive required electric power from the external device 61.

(3) The CPU 12 notifies the swap request that requests a supply of electric power corresponding to a predetermined setting value (the mode in FIG. 3), as the first electric power. According to this configuration, the user can preset electric power, which is to be requested to the external device 61 when an electric power abnormality occurs, by changing the setting value. The CPU 12 can request electric power of the first electric power, which is required when an electric power abnormality occurs, based on the setting value.

(4) The printer 1 includes, as the detector, the AC supply monitoring circuit 36 (an example of the AC detector) which detects a voltage value between the AC port (the power supply cord 28 or the AC outlet) and the DC/DC circuit 30 (an example of the power supply). When the detection value of the AC supply monitoring circuit 36 indicates an abnormal value (S13: YES), the CPU 12 executes the processing of S17, S31, S37 and S41.

According to this configuration, the AC supply monitoring circuit 36 monitors the supply of electric power from the AC power supply, and when the AC supply monitoring circuit 36 detects an electric power abnormality, the swap request is notified to the external device 61, so that it is possible to swap an electric power source and an electric power sink. When the power supply cord is unplugged from the AC outlet and electric power cannot be thus received or when an abnormality of the AC power supply occurs and overcurrent or overvoltage is thus generated, i.e., when electric power cannot be secured from the AC port, the external device 61 is requested to be an electric power source, so that electric power can be received from the external device 61.

(5) When the detection value of the AC supply monitoring circuit 36 indicates an abnormal value, the CPU 12 requests the maximum electric power (an example of the second electric power) from the external device 61, in the processing of S17. According to this configuration, the CPU 12 requests the supply of the second electric power from the external device 61 by the swap request. Thereby, when an electric power abnormality relating to the AC power supply occurs, it is possible to receive required electric power from the external device 61.

(6) In the processing of S31 and S37, the CPU 12 notifies the swap request for requesting a supply of the requesting electric power (an example of the first electric pow corresponding to the predetermined setting value (mode). The maximum electric power (an example of the second electric power) in S17 is electric power equal to or larger than the first electric power. The CPU 12 executes the processing of S29 (an example of the determination processing) of determining whether the swap request for a supply of the maximum electric power is successful, and when it is determined as a result of the processing of S29 that the swap request for the supply of the maximum electric power fails (S29: NO), the CPU 12 notifies the swap request for requesting a supply of the requesting electric power (an example of the first electric power) corresponding to the mode to be operated (S31 and S37).

According to this configuration, when an electric power abnormality relating to the AC power supply occurs, the CPU 12 requests the second electric power equal to or larger than the first electric power corresponding to the setting value. When the second electric power cannot be received, the CPU 12 requests the first electric power to the external device 61. Thereby, when a supply capability of the external device 61 is low, it is possible to request the first amount of electric power required based on the setting value.

(7) The second electric power is the maximum electric power (for example, 100 W) allowed to be requested in the swap request. According to this configuration, when an electric power abnormality relating to the AC power supply occurs and electric power cannot be thus secured from the AC power supply, it is possible to request the maximum electric power allowed to be requested in the swap request from the external device 61, and to secure electric power as much as possible from the external device 61.

(8) The printer 1 includes, as the detector, other detectors (the first and second voltage detection circuits 34 and 35), in addition to the AC supply monitoring circuit 36. When the detection value of the other detector indicates an abnormal value (S11: YES) and the detection value of the AC supply monitoring circuit 36 indicates a normal value (S13: NO), the CPU 12 notifies the swap request, which requests the minimum electric power (an example of the third electric power), to the external device 61 via the USB connection unit 19, in the processing of S15.

According to this configuration, even when an electric power abnormality is detected in the first and second voltage detection circuits 34 and 35, if an electric power abnormality is not detected in the AC supply monitoring circuit 36, i.e., if an electric power abnormality of the AC power supply does not occur, the supply of the third electric power is requested to the external device 61. Thereby, it is possible to receive electric power corresponding to a case where the AC power supply is secured, from the external device 61.

(9) The third electric power is the minimum electric power allowed to be requested in the swap request. When the AC power supply is secured, there is a high possibility that a large amount of electric power is not required from the external device 61. Therefore, the CPU 12 requests the minimum electric power in the swap request from the external device 61, so that it is possible to suppress the external device 61 from falling into a state of deficiency in electric power and to continuously perform communication with the external device 61 with more reliability.

(10) The printer 1 includes the switching circuit 32 (an example of the electric power switching unit) which switches the direction of electric power via the USB connection unit 19. When it is determined that the swap request is successful (S29: YES, S33: YES, S39: YES, S43: YES), the CPU 12 controls the switching circuit 32 to switch the direction of electric power via the USB connection unit 19 from the power supply direction to the power reception direction (S25).

According to this configuration, when the swapping of the electric power roles succeed by the swap request and electric power can be received from the external device 61, the switching circuit 32 is controlled to switch the direction of electric power, so that the electric power received from the external device 61 via the USB connection unit 19 can be supplied to the electronic device in the printer 1.

(11) The printer 1 includes the switch circuit 33 (an example of the switch) which switches the supply of electric power supplied from the USB connection unit 19 to the external device 61. When it is determined as a result of the processing of S19 and S43 that electric power cannot be received from the external device 61 (S19: NO, S43: NO), the CPU 12 executes the processing of S21 (an example of the restriction processing) of controlling the switch circuit 33 to restrict the electric power supplied from the USB connection unit 19 to the external device 61.

According to this configuration, when the swap request fails and electric power cannot be received, the supply of electric power to the external device 61 is restricted. Thereby, it is possible to suppress electric power of overvoltage or overcurrent from being supplied to the external device 61.

(12) The printer 1 includes, as the interface, the USB interface. According to this configuration, in the information processing apparatus which supplies electric power to the external device 61 via the USB interface, when an electric power abnormality occurs, the swap request is notified to the external device 61 and electric power is secured, so that it is possible to continuously perform communication with the external device 61.

(13) The printer 1 includes the image forming unit 16 which forms an image based on image data, and the image scanning unit 17 scans an image of a document. According to this configuration, it is possible to continuously perform communication with the external device 61 by notifying the swap request from the image forming apparatus including the image forming unit 16 and the image scanning unit 17 to the external device 61.

(6. Modified Embodiments)

The present disclosure is not limited to the above embodiment, and can be diversely improved and modified without departing from the gist of the present disclosure.

For example, in the above embodiment, the CPU 12 executes the controls shown in FIGS. 4 to 6. However, another device may also execute the controls. For example, the electric power controller 25 may execute the program PG of the memory 26 to execute the controls shown in FIGS. 4 to 6. In this case, the electric power controller 25 is an example of the controller of the present disclosure. The program PG is an example of the program of the present disclosure.

The configuration of the power supply unit 27 shown in FIG. 2 is an example. For example, in the above embodiment, as the detector, the voltage detection circuits (the first voltage detection circuit 34, the second voltage detection circuit 35 and the AC supply monitoring circuit 36) are provided. However, a current detection circuit which detects current may also be provided as the detector. For example, as shown in FIG. 7, the power supply unit 27 may include a first current detection circuit 34A, a second current detection circuit 35A and an AC supply monitoring unit 36A which each outputs a detection signal based on a current value.

For example, the first current detection circuit 34A outputs information indicating a magnitude of a current value of the supply current As to the CPU 12, as the first detection signal SI1, based on current flowing through an internal resistor connected in series with the electric power line 37. The second current detection circuit 35A compares the magnitude of the current value of the supply current As with the second threshold value TH2, based on the current flowing through an internal resistor connected in series with the switching circuit 32, and to output a result of the comparison to the CPU 12, as the second detection signal SI2, for example. The second threshold value TH2 is a value based on the maximum current allowed to be supplied from the USB connection unit 19, for example, and a current value of 5 A or higher is set. The AC supply monitoring circuit 36A outputs information indicating a magnitude of a current value of AC current to the CPU 12, as the third detection signal SI3, based on AC current flowing through an internal resistor connected in series with a high side (power supply cord 28-side) of the AC/DC circuit 29. In the meantime, the AC supply monitoring circuit 36A may also be connected to the electric power line 38.

Therefore, the first current detection circuit 34A, the second current detection circuit 35A and the AC supply monitoring circuit 36A output the first to third detection signals SI1 to SI3 corresponding to the current value flowing through each electric power line. Similar to the above embodiment, the CPU 12 may determine the electric power abnormality, based on the current value. Specifically, the CPU 12 may compare the current value indicated by the first detection signal SI1 with the first threshold value TH1, and may determine the electric power abnormality when the supply current As is equal to or lower than the predetermined lower limit value (0 A, 0.5 A, 1.5 A or the like), is equal to or higher than the upper limit value (the maximum current value (5 A or the like) of the USB PD standards) or is equal to or higher than the maximum current value that can be transmitted through the electric power line 37.

Figure 7:
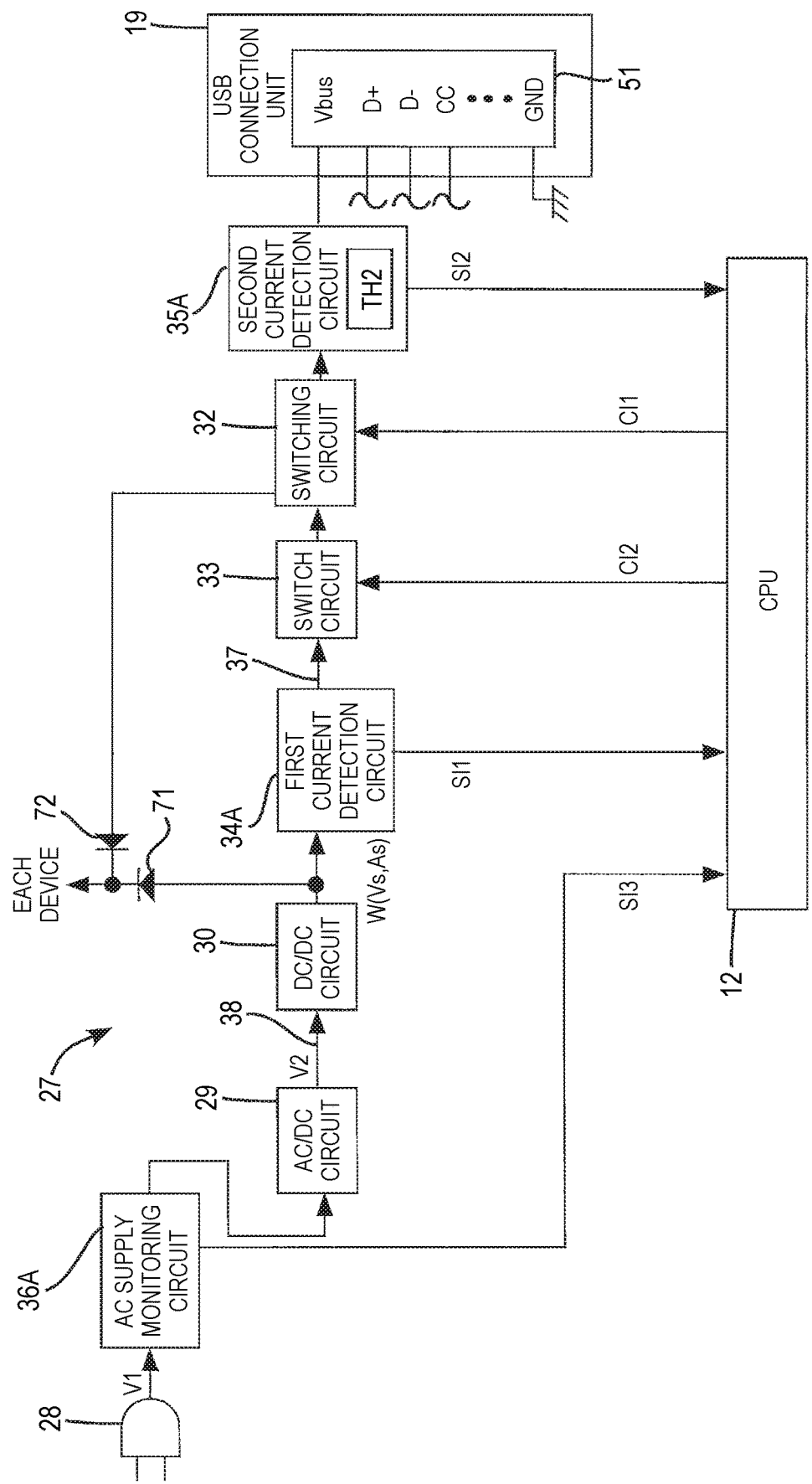
FIG. 7 is a block diagram depicting a configuration of the power supply unit of another example.

Like the second current detection circuit 35A shown in FIG. 7, the detector of the present disclosure may be arranged on the USB connection unit 19-side (low side) of the switch circuit 33. Like the AC supply monitoring circuit 36A, the detector may be arranged on the power supply cord 28-side (high side) of the AC/DC circuit 29. Therefore, the detector of the present disclosure can be connected to the diverse electric power lines from the power supply cord 28 (AC power supply) to the USB connection unit 19 (the interface with the external device 61). Each of the detectors may be the current detection circuit or the voltage detection circuit having the same or different configuration.

The power supply unit 27 shown in FIG. 2 may include at least one of the first voltage detection circuit 34, the second voltage detection circuit 35, and the AC supply monitoring circuit 36. The power supply unit 27 shown in FIG. 7 may include at least one of the first current detection circuit 34A, the second current detection circuit 35A and the AC supply monitoring circuit 36A. That is, the power supply unit 27 may include at least one of the detectors.

The power supply unit 27 may include four or more detectors.

The power supply unit 27 may include a detector which detects a voltage and a detector which detects a current. For example, the power supply unit 27 may include the first voltage detection circuit 34 and the first current detection circuit 34A.

A circuit which detects voltage or current may be provided in the switch circuit 33 or in the switching circuit 32.

The CPU 12 may change the second threshold value TH2 in the second voltage detection circuit 35 and to change a range for determining the electric power abnormality. For example, the CPU 12 may output the control signal to the second voltage detection circuit 35, based on the value of the supply voltage Vs or the supply current As, thereby changing the second threshold value TH2. The CPU 12 may execute the determination by using the second threshold value TH2. The first voltage detection circuit 34 or the first current detection circuit 34A may execute the determination by using the first threshold value TH1.

The first threshold value TH1 and the second threshold value TH2 may be the same value. That is, the first threshold value TH1 may be identical to the second threshold value TH2.

The communication standards of the interface of the present disclosure are not limited to the communication standards of the USB PD standards, and may be other communication standards under which electric power can be transferred.

In the above embodiment, the CPU 12 executes the processing of stopping the electric power that is supplied, in S21. However, the CPU 12 may also execute restriction processing of reducing the voltage value or the current value. That is, the CPU 12 may not completely stop the supply of electric power.

The CPU 12 sets the requesting electric power that is requested in the swap request, depending on the mode to be operated. However, the present disclosure is not limited thereto. For example, the CPU 12 may receive a numerical value (the current value or voltage value) of the requesting electric power from the user. When an electric power abnormality occurs, the CPU 12 may request the requesting electric power of the voltage value or current value received in advance from the external device 61.

The CPU 12 may not execute the processing of S13. For example, when an electric power abnormality is detected in at least one of the first voltage detection circuit 34, the second voltage detection circuit 35 and the AC supply monitoring circuit 36 (S11: YES), the CPU 12 may execute the processing of S17 and thereafter.

The first electric power of the present disclosure is not limited to the electric power corresponding to the mode to be operated. The second electric power is not limited to the maximum electric power. The third electric power is not limited to the minimum electric power. For example, the second electric power may also be the maximum electric power in the electric power list. The first electric power may be the second largest electric power in the electric power list. The third electric power may be the minimum electric power in the electric power list.

The printer 1 may have the image forming unit 16 or the image scanning unit 17.

In the above embodiment, the CPU 12 is adopted as the controller of the present disclosure. However, the present disclosure is not limited thereto. For example, at least some of the controller may be configured by dedicated hardware such as an ASIC (Application Specific Integrated Circuit). The controller may operate in combination with software processing and hardware processing, for example.

The configuration of the information processing apparatus of the above embodiment is an example. For example, the power supply unit 27 may not include the battery 31.

In the above embodiment, the portable printer 1 is adopted as the information processing apparatus of the present disclosure. However, the present disclosure is not limited thereto. For example, the information processing apparatus of the present disclosure may also be a stationary printer, not the portable type, and is not limited to the printer and may also be a copy device, a fax device or a scanner device. The information processing apparatus of the present disclosure may be a complex machine having a plurality of functions. For example, the information processing apparatus of the present disclosure may include a FAX communication unit which transmits and receives FAX data to and from another facsimile device via a phone line. The information processing apparatus of the present disclosure is not limited to the image forming apparatus including the image forming unit 16 and the image scanning unit 17. For example, as the information processing apparatus, a variety of electronic devices having an interface through which electric power can be supplied, such as a camera and a sewing machine, can be adopted.

What is claimed is:

1. An information processing apparatus comprising:
   a power supply;
   an interface;
   a detector configured to detect at least one of a voltage value and a current value on an electric power line that connects the power supply and the interface; and
   a controller configured to notify a swap request for swapping electric power roles with an external device to the external device via the interface,
   wherein the electric power roles include a power source for supplying electric power, and a power sink for receiving electric power, and
   in a case where a detection value of the detector indicates an abnormal value while the information processing apparatus works as the power source that supplies electric power to the external device via the interface, the controller notifies the swap request to the external device in order to switch the electric power role of the information processing apparatus from the power source to the power sink.

2. The information processing apparatus according to claim 1,
   wherein the controller notifies the swap request for requesting a supply of first electric power to the external device via the interface, in the notification.

3. The information processing apparatus according to claim 2,
   wherein the first electric power is electric power corresponding to a predetermined setting value.

4. The information processing apparatus according to claim 1,
   wherein the detector includes an AC detector configured to detect a voltage value or a current value on a portion between an AC port and the power supply, and
   the controller performs the notification in a case where a detection value of the AC detector indicates an abnormal value.

5. The information processing apparatus according to claim 4,
   wherein the controller notifies the swap request for requesting a supply of second electric power to the external device via the interface, in the notification, in a case where a detection value of the AC detector indicates an abnormal value.

6. The information processing apparatus according to claim 5,
   wherein in the notification,
      the controller determines whether the swap request for the supply of the second electric power is successful, and
      in a case where it is determined as a result of the determination that the swap request for the supply of the second electric power fails, the controller notifies the swap request for requesting a supply of first electric power which corresponds to a predetermined setting value, and
   the second electric power is equal to or larger than the first electric power.

7. The information processing apparatus according to claim 5,
wherein the second electric power is a maximum value allowed in the swap request.

8. The information processing apparatus according to claim 6,
wherein the second electric power is a maximum value allowed in the swap request.

9. The information processing apparatus according to claim 4,
wherein the detector includes another detector other than the AC detector, and
wherein the controller notifies the swap request for requesting a supply of third electric power to the external device via the interface, in the notification, in a case where a detection value of the another detector indicates an abnormal value and the detection value of the AC detector indicates a normal value.

10. The information processing apparatus according to claim 9,
wherein the third electric power is a minimum value allowed in the swap request.

11. The information processing apparatus according to claim 1, further comprising:
an electric power switching unit configured to switch a direction of electric power via the interface,
wherein the controller controls the electric power switching unit to switch the direction of electric power via the interface from a power supply direction to a power reception direction in a case where it is determined that the swap request is successful.

12. The information processing apparatus according to claim 1, further comprising:
a switch configured to switch a supply of electric power supplied from the interface to the external device,
wherein the controller controls the switch to restrict the electric power supplied from the interface to the external device in a case where it is determined as a result of the notification that electric power cannot be received from the external device.

13. The information processing apparatus according to claim 1,
wherein the interface is a USB (Universal Serial Bus) interface.

14. The information processing apparatus according to claim 1, comprising at least one of:
an image forming unit configured to form an image based on image data; and
an image scanning unit configured to scan an image of a document.

15. A control method of an information processing apparatus including:
a power supply;
an interface;
a detector configured to detect at least one of a voltage value and a current value on an electric power line that connects the power supply and the interface; and
a controller configured to notify a swap request for swapping electric power roles with an external device to the external device via the interface,
wherein the electric power roles include a power source for supplying electric power, and a power sink for receiving electric power, and
in a case where a detection value of the detector indicates an abnormal value while the information processing apparatus works as the power source that supplies electric power to the external device via the interface, the method comprises a step of notifying the swap request to the external device in order to switch the electric power role of the information processing apparatus from the power source to the power sink.

16. The control method according to claim 15,
wherein the controller notifies the swap request for requesting a supply of first electric power to the external device via the interface, in the notification.

17. The control method according to claim 16,
wherein the first electric power is electric power corresponding to a predetermined setting value.

18. The control method according to claim 15,
wherein the detector includes an AC detector configured to detect a voltage value or a current value on a portion between an AC port and the power supply, and
the controller performs the notification in a case where a detection value of the AC detector indicates an abnormal value.

19. The control method according to claim 18,
wherein the controller notifies the swap request for requesting a supply of second electric power to the external device via the interface, in the notification, in a case where a detection value of the AC detector indicates an abnormal value.

20. A non-transitory computer-readable storage medium storing a computer program, when executed by a computer mounted on an information processing apparatus including:
a power supply;
an interface;
a detector configured to detect at least one of a voltage value and a current value on an electric power line that connects the power supply and the interface; and
a controller configured to notify a swap request for swapping electric power roles with an external device to the external device via the interface,
wherein the electric power roles include a power source for supplying electric power, and a power sink for receiving electric power, and
in a case where a detection value of the detector indicates an abnormal value while the information processing apparatus works as the power source that supplies electric power to the external device via the interface, the computer program is configured to cause the information processing apparatus to notify the swap request to the external device in order to switch the electric power role of the information processing apparatus from the power source to the power sink.

* * * * *